United States Patent Office 2,739,067
Patented Mar. 20, 1956

2,739,067

PRINTING INKS

George L. Ratcliffe, Los Angeles, Calif., assignor to National Lead Company, Los Angeles, Calif., a corporation of New Jersey No Drawing. Application November 12, 1952,
Serial No. 320,105

5 Claims. (Cl. 106—30)

This invention relates to printing inks and is a continuation in part of application Serial No. 220,331, filed April 10, 1951 now Patent No. 2,622,987, December 23, 1952, as to common subject matter.

The dispersion of finely divided pigments in vehicles to produce a material that is suitable as a printing ink is an exceedingly complex art. The type of surface being printed, the particular printing press being used, the speed of operation, and the time of drying are all basic factors which determine the necessary working qualities for a satisfactory ink.

The constant aim of the printing industry has been to increase press speeds. This has required printing inks which set rapidly. Resin-based systems which can be dried by water, steam or hot air are gradually replacing the drying oils. Modern high speed presses require inks which will set in a matter of seconds rather than minutes.

For high speed printing, inks must maintain a proper balance of tack, penetration, and body control. Too high a degree of tack may cause the paper to tear or the ink to mist at high press speeds. Ink with insufficient tackiness will not transfer properly in the printing operation. If penetration of the ink is too great, the print becomes visible from the opposite side of the paper, or causes blurring of figures. Poorly controlled penetration may result in smudging after the ink has been supposedly set. An ink must have body to prevent centrifugal throw-off at high press speeds. Indiscriminate bodying, however, is not the answer. Too viscous an ink will not flow properly from the fountains to the rollers.

Such variation in the conditions that are to be met makes it mandatory for the ink trade to rely on a large number of formulations. Basically however, the performance of an ink, whether it be letter press, lithographic, or rotogravure, will be established by its flow properties.

One of the objects of this invention is to provide a vehicle for an ink base containing a medium capable of imparting to the vehicle viscosity properties to a value to suspend an ink base.

Another object of this invention is to provide a printing ink base suspended by an organic vehicle together with a suspending agent or medium of the character hereinafter described.

Further objects will appear from the detail description in which will be set forth embodiments of this invention. It is to be understood, however, that this invention is susceptible of various embodiments within the scope of the appended claims.

The suspending agent embodying this invention is generally an onium bentonite of the character described in application Serial No. 220,331, Patent No. 2,622,987. In accordance with the disclosure of that application, an organic vehicle has incorporated therewith a medium or agent embodying a modified clay which forms a gel in the vehicle and has a substantial gel characteristic therein. A clay which is particularly useful for modification and for such incorporation is bentonite, including sodium and magnesium bentonites, which have particularly high base-exchange properties, traceable to their high percentage content of montmorillonite. Other clays may, however, be modified as hereinafter described for such employment.

The clays which are useful as starting materials are those exhibiting base-exchange properties, particularly those exhibiting comparatively high base-exchange properties and containing cations capable of more or less easy replacement. The term "clay," as used in the specification and the claims, includes montmorillonite, viz., sodium potassium, lithium, and other bentonites, magnesium bentonite, sometimes called hectorite and saponite. Other clays found in nature are nontronite, attapulgite, illite, zeolites, fuller's earth, particularly those of the Georgia-Florida type, halloysite, kaolinite, nacrite, and dickite. Clay, particularly those having high base-exchange capacities, as a result of certain structural atomic replacements, are believed to have negative charges which are normally neutralized by inorganic cations. As found in nature, therefore, they exist as salts of the weak clay-acids with bases such as the alkali- or alkaline-earth metal hydroxides.

The base-exchange capacities of the various clays enumerated run from a low of about 3 to a high of about 100, based upon milliequivalents of exchangeable base per 100 grams of clay. Montmorillonite has comparatively high base-exchange capacities, viz., 60–100; kaolinite and halloysite have comparatively low base-exchange capacities, viz., 3–15 and 6–15, respectively; attapulgite and illite have higher base-exchange capacities, viz., 25–35 and 15–40, respectively. The clays of higher base-exchange capacities are particularly useful where high exchange of an organic base for the cation of the clay is desired.

Specifically in producing a suspending agent embodying this invention, a clay, particularly one exhibiting substantial base-exchange capacity, is reacted with an organic compound, more particularly one hereinafter generally defined and referred to as an "onium" compound, by substitution of the clay cation with the cation of the organic compound, which cation is of a class hereinafter referred to as an "onium" base. The resulting compound may be used or may be further reacted with another organic compound, resulting in attachment of an organic radical to what is hereinafter generally referred to as the "onium" radical, in place of a hydrogen in the base.

An "onium" compound has been defined in Hackh's Chemical Dictionary, second edition, as:

"A group of organic compounds of the type RXHy which are isologs of ammonium and contain the element X in its highest positive valency, viz:

"Where X is pentavalent as in ammonium, phosphonium, arsonium and stibonium; where X is tetravalent as in oxonium, sulfonium, selenonium and stannonium compounds; and where X is trivalent, as iniodonium compounds; and that they may be considered addition compounds of oxonium, carbonium, stibonium, c. f., -inium, -ylium."

A number of the compounds capable of reacting with clays, particularly bentonite, will be described; it is to be understood, however, that various other compounds reactable with clays, and particularly bentonite or hectorite, may be employed. These may include salts of aliphatic, cyclic, aromatic, and heterocyclic amines, primary, secondary, and tertiary amines and polyamines, also quarternary ammonium compounds, as well as other monovalent or polyvalent onium compounds, such as triphenylalkyl phosphonium, arsonium and stibonium-halides, dialkyl- or aryl-sulphonium and selenonium halides and pyrones, such as 2, 5-dimethyl gamma pyrone hydrochloride.

Untreated sodium bentonite in contact with water absorbs larger quantities of the water and swells, forming a gel. This swelling has been attributed to the lamellar structure of the clay mineral and to adsorption of water molecules onto surfaces of the mineral sheets, thus giving rise to a separation of the sheets as the oriented water layers build up to an appreciable depth. If the surfaces of the clay laminae contain organic matter, as by the process of base-exchange with an organic base, the ability of water molecules to be adsorbed is eliminated, and the clay no longer exhibits its former swelling capacity in water. Thus Wyoming bentonite, for example, which is essentially the sodium salt of montmorillonitic acid, is capable of reacting with organic bases or their salts, e. g.:

1. $Na^+$ bentonite$^-$+$C_{12}H_{25}NH_2H^+OH^- \rightarrow C_{12}H_{25}NH_3^+$ bentonite$^-$+$Na^+OH$, or more readily
2. $Na^+$ bentonite$^-$+$C_{12}H_{25}NH_3CL^- \rightarrow C_{12}H_{25}NH_3^+$ bentonite$^-$+$Na^+CL^-$ The resulting dodecylammonium bentonite is visualized as consisting of clay mineral laminae with dodecylammonium groups fairly regularly distributed over the surfaces and attached by means of the substituted ammonium groups, with the hydrocarbon tails extending out over the crystal surfaces. Such a material is now organophilic rather than hydrophilic and as such exhibits in organic liquids some of the characteristics which the untreated clay exhibited in water; for example, it will swell in many organic liquids and will form stable gels and colloidal dispersions. Such gels are visually homogeneous and often transparent or translucent. They are thermally stable up to the boiling point of the liquid phase and show little tendency to flow or run when heated. The more dilute systems which are more or less liquid have viscosity much higher than those of the liquids themselves, and in most cases exhibit thixotropy characteristic of the analogous bentonite-water system.

The situation is analogous to the above if the element X of the onium compound is other than nitrogen. The onium compound, should, however, be such that, for example, a resultant onium-bentonite will have substantial swelling properties in organic liquids. Such swelling characteristic may be determined by introducing 2 grams of the onium-bentonite product in 100 milliliters of nitrobenzene and noting the amount of swelling in milliliters. Thus in the case of amine-bentonite products, the employment of salts of aliphatic amines, including the octylamine, will not produce an amine-bentonite product showing a swelling of over 7.2 ml.; however, the dodecylamine-bentonite product will show a swelling of from 27 ml. to 65 ml. There is generally a distinct region of increase of swelling with amine-bentonites in which the amine has in excess of 10 carbon atoms in the carbon chain, such swelling being generally in excess of 25 ml. These products may well be called "high-swelling" onium-bentonites.

The ratio of the onium compound, such as, for example, an amine compound to bentonite, may be varied within certain limits in converting the bentonite to the organophilic condition. In general, it is satisfactory to react the amine salt with the bentonite in the ratio of 100 milliequivalents of amine salt to 100 grams to bentonite, which is approximately the base-exchange capacity of the standard highly swelling bentonites. Typical values of swelling on the above basis are listed below for a series of dodecylammonium-bentonites, in which the ratio of amine to bentonite was varied over wide limits:

| Amine/bentonite | 50 me./100 g. | 75 | 100 | 125 | 150 | 200 | 300 |
|---|---|---|---|---|---|---|---|
| Swelling in nitrobenzene; ml | 27.3 | 43.0 | 65.3 | 47.5 | 30.0 | 20.5 | 15.5 |

This table indicates the wide range over which the amine-bentonite ratio can be varied, but it also shows the optimum effect exhibited at the theoretical base-exchange value for this combination.

For the most efficient use of organic base to obtain optimum gelling properties, it is therefore desirable either to select an onium compound, such as an amine compound, which, when converted to the onium base form and reacted by base-exchange with the clay, will completely cover the surface of the mineral or to substitute the proper aliphatic chain in a polyammonium base. It has been found that a base whose hydrophilic radical has a linear dimension of at least 14 angstrom units or molecular area of at least 70 square angstrom units is suitable. For example, a primary amine with a chain of 10 carbon atoms, e. g., decyl amine, will substantially fulfill the requirements of covering the clay surface. An excess of organic matter as occasioned by use of an amine of area greater than 14 linear or 70 square angstrom units, as for example octadecylamine, is not detrimental to the gelling properties of the amine-bentonite composition. Good results, for instance, have been obtained with primary amines having hydrocarbon chains of twelve or more carbon atoms.

The type of clay material to be used may vary with the intended use. For optimum gelling properties, it is best to use a bentonite which exhibits good gelling properties in water. However, some non-swelling clays when converted to the onium salt form will swell in organic liquids and give rise to thixotropic colloidal dispersions.

The following examples illustrate the preparation of suspending agents of the character described.

EXAMPLE I 2750 g. of a Wyoming bentonite was dispersed in 70 liters of water and the slurry allowed to stand for two hours to settle out the non-clay impurities. About 10% of the weight of the bentonite was discarded in this process. 150 g. (2.5 mols) of glacial acetic acid was added to 663 g. (2.5 mols) dimethyl octadecadienylamine and the amine salt then dissolved in 4 liters of warm water. Flocculation of the amine bentonite occurred upon addition of the amine salt solution, and the flocculent precipitate was filtered, washed, dried, and pulverized.

EXAMPLE II 4320 g. of a Wyoming bentonite was dispersed with 124 liters of water and the slurry allowed to stand for two hours to settle out the non-clay impurities. About 10% of the weight of the bentonite was discarded in this process. 1415 g. of dimethyldioctadecylammonium chloride was dissolved in about 10 liters of warm water. Flocculation of the amine bentonite occurred upon addition of the amine salt solution and the flocculent precipitate was filtered, washed, dried and pulverized.

EXAMPLE III

Triphenyl-lauryl phosphonium bromide was prepared by fluxing a mixture of equivalent weights of triphenylphosphine and lauryl bromide. After six hours the reaction mixture was cooled and dissolved in alcohol. To a dispersion of 50 g. of Wyoming bentonite in one liter of water was added an alcohol solution of 0.05 mol of the phosphonium base. Upon bringing the pH of the slightly basic dispersion to about 4 with dilute hydrochloric acid, the bentonite complex flocculated, was filtered, washed, dried, and ground. 2 g. of this powdered product, placed in 100 ml. of nitrobenzene in a graduate, swelled to a translucent yellow gel occupying a volume of 66 ml. Mild agitation was sufficient to disperse the gel to a stable translucent thixotropic solution.

EXAMPLE IV

One-tenth mol of didodecyl ethyl sulfonium bromide is dispersed in one liter of water, and this is then mixed by agitation with 400 cc. of a 2½% suspension of Wyoming bentonite. After one hour's standing, it is filtered, dried, and ground.

The modified clays of which the above examples are simply illustrative, form gels in organic vehicles and can, therefore, be readily incorporated with an ink base. The modified clay (suspending agent) can be added to a vehicle to form a gel and the ink base can thereafter be added. However, the suspending agent can be added to an ink base and vehicle. In either event, it will act to keep the ink base in suspension. The general structure of the onium bentonites in printing inks is invaluable in obtaining the proper balance of working properties. It has proven advantageous in controlling consistencies, tack, and penetration in printing inks. The addition of 3% of the amine bentonite of Example II to a newsprint ink will reduce tack and eliminate most of the normal misting on presses operating at speeds of 900 to 1500 linear feet per minute. Addition of 4% of the amine bentonite to the same ink virtually eleminates this throw-off. It does a unique job in controlling consistency without adversely affecting solvent release during the printing and setting operations. Penetration of the printing ink is closely controlled by the amine bentonites. This allows the use of substantial quantities of low boiling volatile solvents, useful in quick-drying inks.

The amine bentonite is added to the ink vehicle and milled therein to thoroughly incorporate the same. Sufficient of the amine bentonite is employed to secure the desired viscosity to a value to suspend an ink base. If necessary the viscosity may be further controlled by the addition of a viscosity reducing agent, for example, naphthenic acid.

Typographic or letterpress inks vary from the highly fluid news inks, to magazine and bookbinders inks which have a much heavier consistency. These inks usually are set by some combination of penetration, oxidation and forced evaporation.

Heat set newsprint ink is used in newspapers, telephone books, etc. which are usually printed on porous stock at high press speeds. Newsprint inks dry mainly by penetration and absorption, although some heat is utilized to speed drying and prevent smudging. Costs being of prime importance, newsprint inks have been formulated traditionally with relatively cheap ingredients. The onium bentonites, by controlling viscosity and tack, and therefore penetration and centrifugal throw-off, fulfill a pressing need. A sample black ink formulation is as follows:

*Heat set black newsprint ink*

| | Pounds |
|---|---|
| Mineral oil | 100 |
| Rosin | 4 |
| Carbon black | 15 |
| The amine bentonite of Example II | 1–4 |
| | 120–123 |

In the above formulation, mineral oil may be replaced with a portion of fairly heavy-bodied asphaltic residues, mixed with varying amounts of light petroleum fractions. These fractions do not volatilize rapidly at room temperatures, but are readily evaporated when high temperature forced air heating is applied to the paper being printed. Blacker news inks can be made by incorporation of a small quantity of methyl violet toner or similar blue colorant. Satisfactory inks of other colors may be made by substituting other colored oil soluble dyes or toners in proper quantities to give the ink the desired color and flow characteristics.

Other heat set typographic inks, such as high grade inks for periodicals, of a quality superior to newsprint inks, contain vehicles (essentially binders plus solvents) which are not volatile at room temperatures. The following is a good example of the use of the amine bentonite of Example II in a better quality typographic ink in which tack, body and penetration are controlled.

*Non-smudging heat set black typographic ink*

| | Pounds |
|---|---|
| Varnish (modified phenol-formaldehyde) | 25 |
| Petroleum solvents | 40 |
| No. 5 Litho Varnish (bodied linseed oil) | 5 |
| Carbon black | 19 |
| Talc | 2 |
| Prussian Blue in linseed oil (50%) | 4 |
| Alkaline Blue in linseed oil (50%) | 4 |
| The amine bentonite of Example II | 3–4 |
| | 102–103 |

Inks of this type are extremely flexible and non-smudging. They print well and set rapidly at high temperatures.

A water or steam set ink may be defined as an ink in which a certain portion of the vehicle comprises higher alcohols or glycols, which are miscible in water, mixed with water insoluble resins. When such an ink is applied, it may be water set or steam set by diluting the water miscible portion of the vehicle in such a manner that the remaining resin precipitates and sets rapidly.

The use of the onium bentonite in steam or water set inks will not greatly affect the body, due to the polar solvent content. The presence of the onium bentonite will control tack, by producing a characteristic shortness in the ink. The overall printing properties of the ink at high press speeds wil be greatly improved.

*Steam-set black typographic ink*

| | Pounds |
|---|---|
| Resin (maleic rosin modified) | 28.8 |
| Triethenolamine resinate | 14.4 |
| Diethylene glycol | 33.8 |
| Carbon black | 18 |
| Milori Blue pigment | 5 |
| The amine bentonite of Example II | 3–4 |
| | 103.0–104.0 |

Lithographic printing inks are very similar in composition to typographic inks, except that the body is somewhat greater, and pigment concentration is higher. Lithographic offset-printing is the process for printing on sheet metal to be used for making tin cans and other containers. The benefits and principles of the use of the onium bentonites given above apply here also.

In general, intaglio inks have a more fluid consistency than other types of inks. Solvents are more volatile and setting is based on evaporation. For rotogravure work, a copper cylinder is employed, and soft pigments must be used. The onium bentonite does an effective job here as in other inks. Since evaporation is the means of drying the ink, it is noteworthy that the onium bentonite does not impair solvent release. The onium bentonite has an extremely small particle size, (.5 micron) and when properly dispersed, will not injure or deface the relatively soft metal plates used in the intaglio process.

Having thus described my invention, what is claimed and desired to be secured by Letters Patent is:

1. An ink, comprising, an ink base suspended in an organic ink vehicle having colloidally dispersed therein to an extent sufficient to increase the viscosity thereof to a value to suspend the ink base, a clay originally exhibiting a substantial base-exchange capacity, wherein the clay cation has been replaced by a substituted ammonium cation and which forms a gel in the vehicle and has a substantial gel characteristic therein.

2. An ink, comprising, an ink base suspended in an organic ink vehicle having colloidally dispersed therein to an extent sufficient to increase the viscosity thereof to a value to suspend the ink base, an amine bentonite.

3. An ink, comprising, an ink base suspended in an organic ink vehicle, having colloidally dispersed therein to an extent sufficient to increase the viscosity thereof to a value to suspend the ink base, an octadecylamine bentonite.

4. An ink, comprising, an ink base suspended in an organic ink vehicle, having colloidally dispersed therein to an extent sufficient to increase the viscosity thereof to a value to suspend the ink base, a dimethyldioctadecylamine bentonite.

5. An ink, comprising, an ink base suspended in an organic ink vehicle, having colloidally dispersed therein to an extent sufficient to increase the viscosity thereof to a value to suspend the ink base, a dodecylamine bentonite.

References Cited in the file of this patent

UNITED STATES PATENTS 2,622,987     Ratcliffe _____ Dec. 23, 1952

OTHER REFERENCES

Gregory: "Uses and Applications of Chemicals and Related Materials," vol. II, 1944, page 226.